(12) United States Patent
Purushothaman

(10) Patent No.: US 10,122,744 B2
(45) Date of Patent: Nov. 6, 2018

(54) SECURITY VIOLATION ASSESSMENT TOOL TO COMPARE NEW VIOLATION WITH EXISTING VIOLATION

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 60 days.

(21) Appl. No.: 15/345,072

(22) Filed: Nov. 7, 2016

(65) Prior Publication Data
US 2018/0131709 A1    May 10, 2018

(51) Int. Cl.
*G06F 21/62* (2013.01)
*H04L 29/06* (2006.01)
*H04L 9/30* (2006.01)

(52) U.S. Cl.
CPC .......... *H04L 63/1425* (2013.01); *H04L 63/20* (2013.01); *H05K 999/99* (2013.01)

(58) Field of Classification Search
CPC .............................. H04L 63/1425; H04L 63/20
USPC ........................................................ 726/23
See application file for complete search history.

(56) References Cited

U.S. PATENT DOCUMENTS

| | | | |
|---|---|---|---|
| 7,506,360 B1 * | 3/2009 | Wilkinson | H04L 63/1433 709/223 |
| 8,099,787 B2 | 1/2012 | Vasudeva | |
| 8,201,257 B1 | 6/2012 | Andres et al. | |
| 8,438,644 B2 | 5/2013 | Watters et al. | |
| 8,800,044 B2 | 8/2014 | Raad | |
| 8,904,526 B2 | 12/2014 | Deb et al. | |
| 9,015,846 B2 | 4/2015 | Watters et al. | |
| 2006/0288420 A1 * | 12/2006 | Mantripragada | G06F 21/51 726/25 |
| 2010/0007489 A1 * | 1/2010 | Misra | G06Q 10/00 340/540 |
| 2010/0039259 A1 * | 2/2010 | Hazzani | G07C 9/00087 340/541 |
| 2010/0088338 A1 * | 4/2010 | Pavoni, Jr. | G06Q 20/02 707/770 |
| 2010/0162347 A1 * | 6/2010 | Barile | G06F 21/552 726/1 |
| 2010/0192201 A1 * | 7/2010 | Shimoni | G06F 21/55 726/3 |
| 2010/0199345 A1 * | 8/2010 | Nadir | H04L 63/02 726/11 |
| 2010/0235918 A1 * | 9/2010 | Mizrahi | H04L 63/1416 726/25 |

(Continued)

*Primary Examiner* — Haresh N Patel
(74) *Attorney, Agent, or Firm* — Michael A. Springs

(57) ABSTRACT

A method comprises receiving a notification of a new system violation and classifying, based on characteristics of the new system violation, the new system violation as one or more of: an access violation; a configurational violation; an unauthorized modification; a usage violation; and an unsecured surface violation. The method also comprises comparing the new system violation in combination with one or more of a plurality of existing system violations to a plurality of entries and determining, based on the comparison of the new system violation and the one or more plurality of existing system violations to the plurality of entries, whether the new system violation threatens the system.

9 Claims, 5 Drawing Sheets

(56) References Cited

U.S. PATENT DOCUMENTS

| | | | | |
|---|---|---|---|---|
| 2010/0293407 A1* | 11/2010 | Locasto | ............. | G06F 11/3672 |
| | | | | 714/2 |
| 2011/0088100 A1* | 4/2011 | Rutman | ................. | G06F 21/10 |
| | | | | 726/28 |
| 2012/0023324 A1* | 1/2012 | Sorensen | ............ | H04L 63/1416 |
| | | | | 713/151 |
| 2012/0023576 A1* | 1/2012 | Sorensen | .............. | G06F 21/577 |
| | | | | 726/22 |
| 2013/0262947 A1* | 10/2013 | Unno | ................... | G06F 11/004 |
| | | | | 714/746 |
| 2017/0187686 A1* | 6/2017 | Shaikh | ............... | H04L 63/0263 |
| | | | | 713/146 |
| 2017/0214716 A1* | 7/2017 | Lee | .................. | G06F 17/30424 |
| | | | | 726/4 |

\* cited by examiner

SECURITY VIOLATION ASSESSMENT TOOL TO COMPARE NEW VIOLATION WITH EXISTING VIOLATION

TECHNICAL FIELD

This disclosure relates generally to a system for improving system security. More specifically, this disclosure relates to improving system security using a security violation assessment tool.

BACKGROUND

The security and/or functionality of a system may be threatened in various ways. As one example, the system may experience one or more system violations that present a threat to the system. Accordingly, maintaining the security of a system is important to the functioning of the system.

SUMMARY OF THE DISCLOSURE

According to one embodiment, a security violation assessment tool comprising a memory, an identification engine, and an evaluation engine. The memory is configured to store a plurality of entries and a plurality of existing system violations. Each of the plurality of entries comprises at least a classification of one or more system violations, wherein each system violation comprises a deviation from a baseline, the baseline being assigned to a specific user of the system, and an indication of whether the one or more system violations is a threat to a system. Each of the plurality of existing system violations indicates a previous deviation from a baseline and comprises at least a classification of the existing system violation. The identification engine is configured to receive a notification of a new system violation and classify, based on characteristics of the new system violation, the new system violation as one or more of an access violation, a configurational violation, an unauthorized modification, a usage violation, and an unsecured surface violation. The evaluation engine is configured to compare the new system violation in combination with one or more of the plurality of existing system violations to the plurality of entries and determine, based on the comparison of the new system violation and the one or more plurality of existing system violations to the plurality of entries, whether the new system violation threatens the system.

According to another embodiment, a method comprises receiving a notification of a new system violation and classifying, based on characteristics of the new system violation, the new system violation as one or more of an access violation, a configurational violation, an unauthorized modification, a usage violation, and an unsecured surface violation. The method also comprises comparing the new system violation in combination with one or more of a plurality of existing system violations to a plurality of entries and determining, based on the comparison of the new system violation and the one or more plurality of existing system violations to the plurality of entries, whether the new system violation threatens the system. Each of the plurality of existing system violation indicates a previous deviation from a baseline and comprises at least a classification of the existing system violation. Each of the plurality of entries comprises at least a classification of one or more system violations, wherein each system violation comprises a deviation from a baseline, the baseline being assigned to a specific user of the system, and an indication of whether the one or more system violations is a threat to the system.

According to another embodiment, one or more computer-readable non-transitory storage media embodying software that is operable when executed to receive a notification of a new system violation and classify, based on characteristics of the new system violation, the new system violation as one or more of an access violation, a configurational violation, an unauthorized modification, a usage violation, and an unsecured surface violation. The software is further operable to compare the new system violation in combination with one or more of a plurality of existing system violations to a plurality of entries. Each of the plurality of existing system violations indicates a previous deviation from a baseline and comprises at least a classification of the existing system violation and each of the plurality of entries comprises at least a classification of one or more system violations, wherein each system violation comprises a deviation from a baseline, the baseline being assigned to a specific user of the system, and an indication of whether the one or more system violations is a threat to a system The software is further operable to determine, based on the comparison of the new system violation and the one or more plurality of existing system violations to the plurality of entries, whether the new system violation threatens the system.

According to another embodiment, one or more computer-readable non-transitory storage media embodying software that is operable when executed to create a word vector from a message, calculate a value for the word vector, and identify that the message belongs to a first group by comparing the value for the word vector to a threshold. The word vector comprises an entry for each word of a plurality of words, wherein each word of the plurality of words is assigned a weight. The value for the word vector is calculated based on each entry of the word vector and the weights assigned to the plurality of words.

Certain embodiments may provide one or more technical advantages. For example, an embodiment of the present disclosure may improve security by identifying when a system is threatened by a combination of a new system violation and one or more previous existing system violations. As another example, an embodiment of the present disclosure may improve security by permitting system access to authorized users and/or denying system access to unauthorized users. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
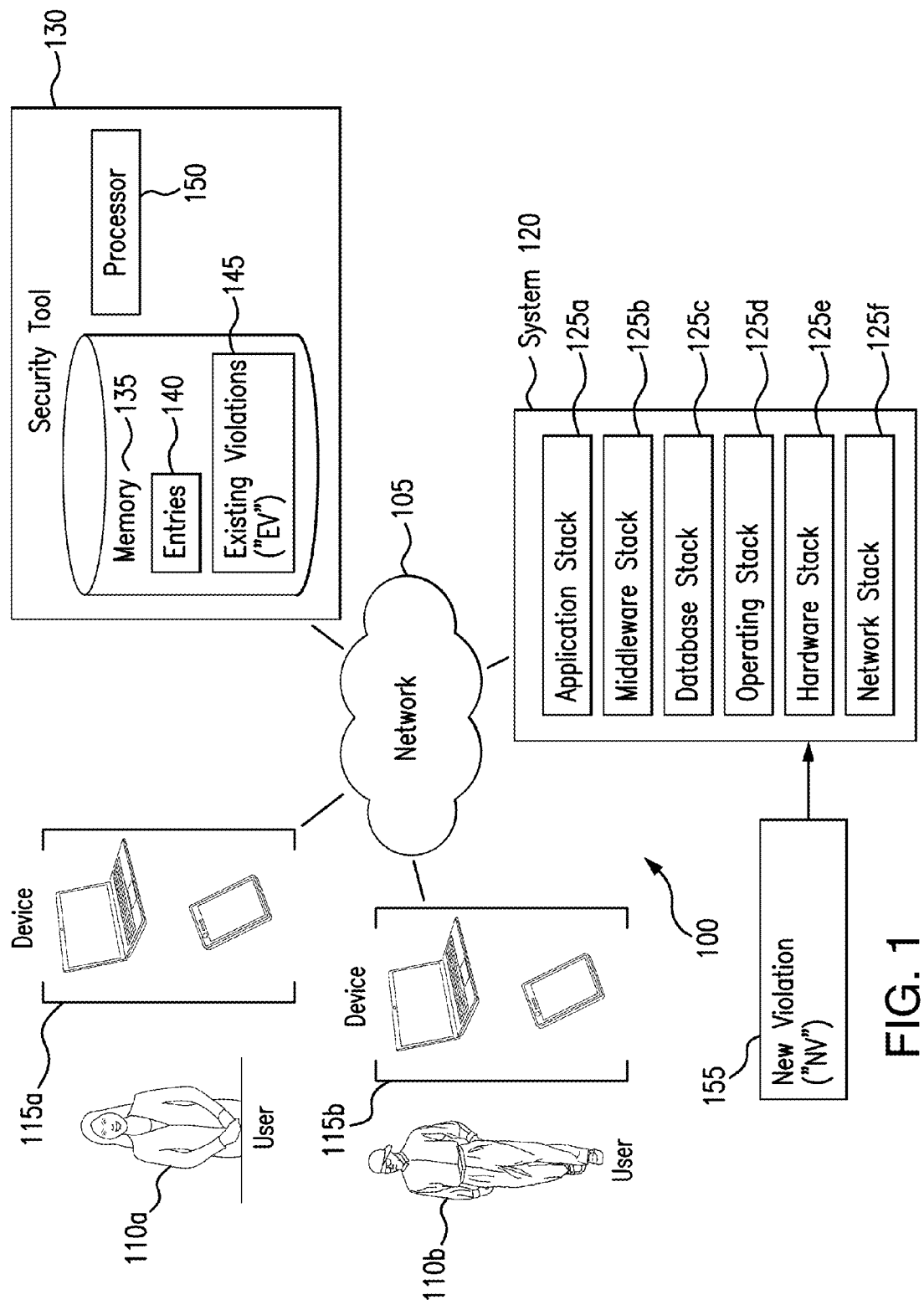
FIG. 1 is a block diagram illustrating a system for improving network security by assessing system violations and enhancing system security using a security tool, according to certain embodiments.

Embodiments of the present disclosure and its advantages are best understood by referring to FIGS. 1 through 5 of the drawings, like numerals being used for like and corresponding parts of the various drawings.

It is important to quickly identify and assess each violation of a system because a single system violation may compromise the functionality and/or security of the system. As a few examples, a system may be threatened when an unauthorized user accesses information stored on the system, edits or deletes information stored on the system, and changes user accessibility to one or more components of the system.

Existing systems may employ software and/or hardware capable of determining whether a new system violation independently presents a threat to the system. Unfortunately, these traditional systems fail to account for the threat posed by the new system violation in light of pre-existing system violations. As a result, traditional systems may inaccurately determine that the new system violation does not pose a threat to the system when, in actuality, the new system violation poses a significant threat. As mentioned above, an inaccurate assessment of a violation may have serious consequences that compromise the system. Accordingly, this disclosure contemplates a security tool that improves the security of the system by evaluating the risk posed by a new system violation in light of existing system violations.

Additionally, the security tool as described herein may improve the security of the system by reducing the number of "false positives." As used herein, a "false positive" refers to an incorrect assessment that a system violation is a threat. For example, the system may determine that a new system violation is a threat when it is actually not. Generally, in traditional systems, in response to determining that a particular system violation is a threat, all requests from the user associated with the particular system violation are blocked or stopped such that the associated user cannot proceed with his/her request. In such situations, the system may prevent a genuine user from receiving a response from the system. By more accurately assessing the threats presented by a system violation, the security tool as described herein may reduce the number of false positives and permit the fulfilment of genuine user requests.

By using the security tool, security and functionality of a system may be maintained and/or improved. As explained above, the present disclosure provides a security tool configured to assess whether a new system violation presents a threat to the system based on existing system violations. As such, the security tool may more accurately assess the threats posed by system violations and the security tool may be associated with various efficiencies, including but not limited to, quicker detection and resolution of actual system threats. Other benefits of using the security tool described herein include permitting authorized users to access the system while blocking or stopping unauthorized users from accessing the system. Accordingly, the security tool described in the present disclosure may maintain or improve the functionality and/or security of the system. The security tool will be described in more detail below in reference to FIGS. 1 through 5. Specifically, the assessment function of the security tool (also referred to as a security violation assessment tool) will be described in reference to FIGS. 1 through 3 and the security enhancement function of the security tool (also referred to as a security enhancement tool) will be described in reference to FIGS. 1, 2, and 4.

FIG. 1 illustrates a network environment 100 for improving the functionality and security of a system 120 by using a security tool 130. As illustrated in FIG. 1, network environment 100 includes a network 105, one or more users 110, one or more devices 115, system 120, and security tool 130. Generally, security tool 130 is capable of determining whether a violation threatens system 120 and increasing security of system 120 if the violation does threaten system 120.

Network 105 may refer to any interconnecting system capable of transmitting audio, video, signals, data, messages, or any combination of the preceding. Network 110 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Examples of wireless networks 110 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

As described above, network environment 100 may include one or more users 110. The one or more users 110 may be associated with one or more devices 115. As depicted in FIG. 1, network environment 100 includes two users: user 110a and user 110b. User 110a is associated with devices 115a and user 110b is associated with devices 115b. In some embodiments, users 110 use devices 115 to communicate with one or more users 110 or components (e.g., system 120 and security tool 130) over network 105. For example, user 110a may be an authorized user (also referred to herein as a "genuine user") of system 120 and may use device 115a to fix issues experienced by system 120. As another example, user 110b may be an unauthorized user of system 120 and may use device 115b to hack into system 120. Although this disclosure describes and depicts user 110 being associated with only two devices 115 and using devices 115 in particular manners, this disclosure recognizes that user 110 may be associated with any suitable number of devices 115 and may use devices 115 in other manners.

This disclosure contemplates device 115 being any appropriate device that can communicate over network 105. For example, device 115 may be a computer, a laptop, a wireless or cellular telephone, an electronic notebook, a personal digital assistant, a tablet, a server, a mainframe, or any other device capable of receiving, processing, storing, and/or communicating information with other components of network environment 100. Device 115 may also include a user interface, such as a display, a microphone, keypad, or other appropriate terminal equipment usable by a user. In some embodiments, an application executed by device 115 may perform the functions described herein.

As described above, network environment 100 may include system 120 in some embodiments. System 120 may include one or more stacks (or layers). For example, as depicted in FIG. 1, system 120 includes an application stack 125a, a middleware stack 125b, a database stack 125c, an operating stack 125d, a hardware stack 125e, and a network stack 125f. Application stack 125a may include one or more applications or programs that are configured to be executed on system 120. For example, application stack 125a may include Java, .NET, Cold Fusion, etc. Middleware stack 125b may include software that provides services to applications. For example, middleware stack 125b may include Apache, Tomcat, IBM WebSphere, Microsoft Internet Information Systems (IIS), etc. Database stack 125c may include one or more databases of system 120. For example, database stack 125c may include SQL, ORACLE, Sybase, Mysql, etc. Operating stack 125d may include one or more operating system software of system 120. For example, operating stack 125d may include Linux, Windows, Solaris, AIX, HP, etc. Hardware stack 125e may include one or more hardware of system 120. For example, hardware stack 125e may include hardware manufactured by Lenovo, HP, Dell, IBM, SUN, etc. Network stack 125f may include one or more networks of system 120. For example, network stack 125f may include DMZ, internal VLAN, WAN, etc. Although this disclosure describes and depicts certain stacks 125, this disclosure recognizes that system 120 may include any suitable stack 125.

In some embodiments, network environment 100 also includes security tool 130. Security tool 130 may be configured to determine whether a violation of system 120 is a threat, and, if so, increase the security of system 120. To execute these functions, security tool 130 includes a memory 135 and a processor 150. Memory 135 may be configured to store a plurality of entries 140 and a plurality of existing violations ("EV") 145. Although this disclosure describes and depicts security tool 130 comprising memory 135, this disclosure recognizes that security tool 130 may not comprise memory 135 in some embodiments. In such embodiments, memory 135 may be a standalone component or part of a component connected to network 150 and be accessible to security tool 130 via network 105. In some embodiments, security tool 130 may be a program executed by a computer system. As an example, security tool 130 may be executed by a computer such as the computer 500 described below in reference to FIG. 5. In such example, memory 135 may be memory 520 and processor 150 may be processor 510 of computer 500.

Figure 2:
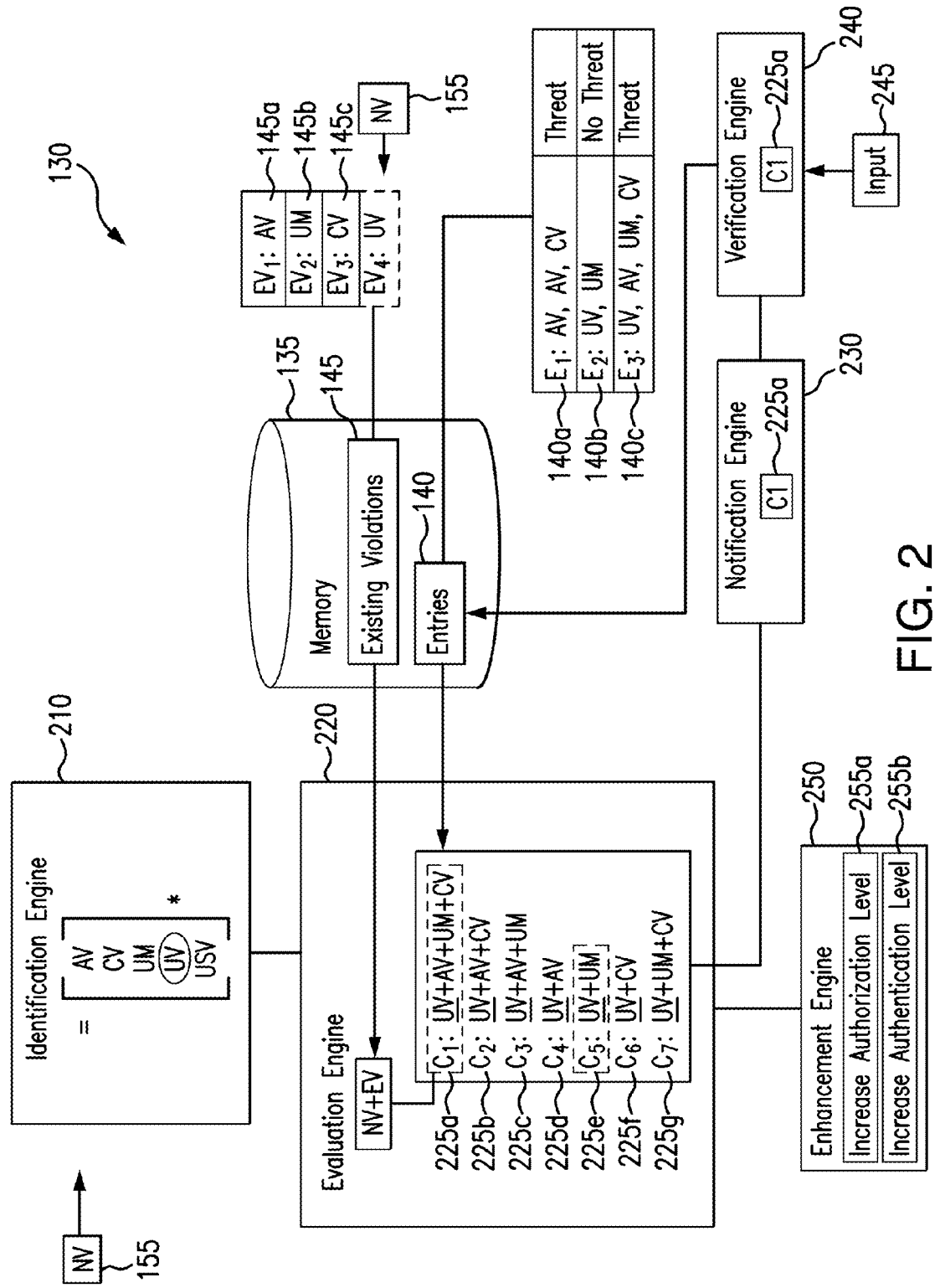
FIG. 2 is a block diagram illustrating the assessment of system violations and enhancement of system security by the security tool FIG. 1, according to certain embodiments.

Each entry of the plurality of entries comprises at least a classification of a system violation and an indication of whether the system violation is a threat to the system. As is described in more detail below, a system violation may be classified as one or more of an access violation, a configurational violation, an unauthorized modification, a usage violation, and an unsecured surface violation. In some embodiments, an entry may comprise more than one classification of a system violation. For example, as depicted in FIG. 2, Entry 1 ("$E_1$") 140a comprises three classification of system violations, Entry 2 ("$E_2$") 140b comprises two classifications of system violations, and Entry 3 ("$E_3$") 140c comprises four classifications of system violations. In some embodiments, the threat potential of a system violation may correspond to a location of the system violation. Thus, each entry 140 stored in memory 135 may also include an identification of one or more stacks 125 of system 120 affected by a particular classification of system violation. As an example, $E_2$ 140b may relate the usage violation (UV) to a particular stack 125 (or multiple stacks) and the unauthorized modification (UM) to a particular stack 125 (or multiple stacks). As a specific example, $E_2$ may include a "no threat" indication when the UV affects database stack 125c and the UM affects either application stack 125a or middleware stack 125b. In contrast, $E_4$ (not depicted) may include a "threat" indication when the UV affects operating stack 125d and the UM affects either application stack 125a or middleware stack 125b.

As described above, memory 135 may also be configured to store a plurality of existing system violations 145. Each existing violation 145 may indicate a previous attempt to threaten or compromise system 120. For example, if memory 135 includes five existing system violations 145, this may indicate that system 120 or security tool 130 has detected five previous system violations. Each existing violation 145 comprises at least a classification of the existing system violation 145. For example, each existing system violation 145 is classified as an access violation, a configurational violation, an unauthorized modification, a usage violation, and an unsecured surface violation. For example, as illustrated in FIG. 2, Existing Violation 1 ($EV_1$) 145a shows that the existing violation was an access violation (AV). In some embodiments, each existing violation 145 also comprises an identification of an affected stack 125 or component associated with the existing violation 145. Taking the above example of $EV_1$ 145a, the AV may have occurred in application stack 125a.

Generally, FIG. 1 shows that system 120 experiences a new system violation ("NV") 155. As used herein, a violation (including existing violations 145 and new violation 155) refers to a deviation from a baseline and corresponds to an action of a user 110. Each user 110 may be associated with one or more baselines. As one example, user 110a may be associated with five baselines: (i) a baseline for determining access violations, (ii) a baseline for determining configurational violations, (iii) a baseline for determining unauthorized modifications, (iv) a baseline for determining usage violations, and (v) a baseline for determining unsecured surface violations. The one or more baselines associated with user 110a, an authorized user, may be different from one or more baselines associate with user 110b, an unauthorized user. Additionally, the one or more baselines associated with authorized user 110a may be different from one or more baselines associated with an authorized user 110c (not depicted). Thus, baselines may vary from user to user.

A user 110 may trigger a system violation by taking an action on system 120 that user 110 does not have permission from system 120 to take. For example, a baseline for user 110 may define a plurality of actions that user 110 is able to take (e.g., delete home address, update phone number, and set up direct deposit). If user 110 attempts to take an action on system 120 that is not permitted (e.g., change name on account), this impermissible action is noted as a system violation. As another example, a baseline for user 110 may define login credentials associated with user 110. Thus, any attempt by user to login using incorrect credentials is noted as a system violation. Although this disclosure describes certain types of baselines and deviation from baselines, this disclosure recognizes that a baseline may define any number of things associated with a user and that a deviation from that baseline is a system violation.

In some embodiments, system 120 may be configured to detect system violations. In other embodiments, security tool 130 may be configured to detect system violations. In either case, system violations are detected by monitoring baselines and identifying deviations from baselines. System violations may be potentially harmful in some instances. For example, a system violation wherein a user 110 attempts to hack into a database and steal information about one or more users 110 of system 120 may be harmful to system 120.

This disclosure recognizes that system violations may threaten system 120 in different ways. For example, system 120 may be threatened by a loss of confidentiality of the system, a loss of integrity of the system, a loss of availability of the system, a loss of accountability of the system, a damage to a reputation of the system, a non-compliance issue and/or a violation of privacy. As used herein, a loss of confidentiality may refer to a disclosure of data to an unauthorized user 110. The disclosure may be of proprietary data, confidential data, or any other data that a user 110 is not authorized to view. For example, an unauthorized user may attempt to access proprietary source code stored on system 120. As used herein, a loss of integrity may refer to any data being modified or deleted by an unauthorized user 110. For example, system 120 may be threatened by an unauthorized user 110 deleting all or a portion of data stored in a database. As used herein, a loss of availability may refer to data or components of system 120 being unavailable to users 110. For example, an unauthorized user 110 may disable one or more critical components of system 120 causing the system to become unavailable to one or more users 110. As used herein, a loss of accountability may refer to an inability to access the administrative capabilities and/or control actions. For example, an unauthorized user may compromise the admin modules of system 120 thereby permitting the unauthorized user to have complete control over system 120. As used herein, a loss of damage to system reputation may refer to a decrease in user satisfaction of system 120. Taking a few of the above examples of system violations, users 110 may be less satisfied with system 120 if an unauthorized user 110 gains access to confidential information of system 120 and/or if an unauthorized user 110 disables a critical component of system 120. As used herein, a non-compliance issue may refer to any action on system 120 that causes system 120 to become non-compliant with government regulations. For example, an unauthorized user may take actions on system 120 that causes system 120 or the environment of system 120 to become non-compliant with certain regulations. As used herein, a violation of privacy may refer to a disclosure of a user's private information. For example, system 120 may store private or personal information about users 110 (e.g., names of users 110, account information of user 110, home address of user 110) that an unauthorized user 110 may attempt to access. Such an attempt by the unauthorized user may result in loss of a user's private information.

Although some system violations may threaten the security or functionality of system 120, system violations may also be harmless. This concept may be best illustrated using the above example of a baseline defining user credentials. Sometimes an authorized user (e.g., user 110*a*) may temporarily forget his/her password. Although attempting to login with invalid credentials may trigger a system violation, the system violation is likely harmless to system 120. To this end, it is not enough to identify system violations. Rather, each system violation must be assessed to determine whether the system violation presents a threat to system 120.

As described above, traditional systems analyze each system violation in isolation. This approach has certain deficiencies. Namely, analyzing system violations in isolation fails to account for threats posed by combinations of system violations. As described herein, security tool 130 assesses the threat presented by combinations of seemingly harmless system violations thereby improving threat detection. Thus, security tool 130 may identify otherwise undetected threats to system 120. The threat assessment function of security tool 130 is described in more detail below in reference to FIG. 2.

FIG. 2 illustrates security tool 130 of network environment 100. As described above, security tool 130 may serve two main functions: (1) threat assessment; and (2) security enhancement. These functions may be executed by one or more various engines of security tool 130. For example, as depicted in FIG. 2, security tool 130 may comprise an identification engine 210, an evaluation engine 220, a notification engine 230, a verification engine 240, and an enhancement engine 250. In some embodiments, engines 210, 220, 230, 240, and 250 are executable software. In other embodiments, engines 210, 220, 230, 240, and 250 are hardware. In yet other embodiments, engines 210, 220, 230, 240, and 250 are a combination of software and hardware.

As described above, security tool 130 may be communicably coupled to memory 135. As a result, the engines of security tool 130 may have access to the plurality of entries 140 and the plurality of existing violations 145. Generally, identification engine 210 may be configured to determine, based on characteristics of the new violation 155, a classification of the system violation of the new violation 155. Evaluation engine 220 may be configured to receive the plurality of existing violations 145 and determine whether new violation 155 in combination with one or more of existing violations 145 poses a threat to system 120. Notification engine 230 may be configured to flag for review one or more combinations determined to be a threat to system 120 by evaluation engine 220. Verification engine 240 may be configured to receive input regarding a particular combination and update one or more of entries 140 based on the received input. Finally, enhancement engine 250 may be configured to increase the security of system 130 in response to determining that the new violation poses a threat to system 130.

Security tool 130 may comprise an identification engine 210 in some embodiments. Identification engine 210 may be configured to identify a new violation 155 of system 120. As described above, identifying a new system violation 155 may comprise monitoring a baseline and determining when a deviation from the baseline occurs. If identification engine 210 is configured to identify new violations 155 in system 120, identification engine may also be configured to receive, from system 120, information about a baseline for a user 110 and information about the actions of user 110 to determine whether a user 110's actions deviates from the received baseline. Alternatively, system 120 may identify system violations and notify identification engine 210 when a new system violation 155 has occurred (as depicted in FIG. 2). In a different embodiment, a separate system or component of network environment 100 determines whether a new system violation 155 occurs and notifies notification engine 210 accordingly. New system violation 155 may occur anywhere in system 120 and may be performed by any user of system 120.

As an example, a system violation may occur each time that unauthorized user 110*b* sends a request to system 120 using device 115*b*. As a specific example, unauthorized user 110*b* may request to login to system 120 with invalid credentials and subsequently attempt to modify components of system 120 through a backend server. Identification engine 210 may receive a baseline corresponding to user 110*b* and continuously monitor activity of user 110*b* on system 120. Thus, when unauthorized user 110*b* submits invalid credentials to system 120 or requests to modify a component of system 120, identification engine will recognize that these user actions fall outside the baseline of user 110b and register these user activities as system violations.

In addition to identifying new violation 155 or receiving notice of new violation 155, identification engine 210 may be configured to classify new violation 155. A system violation may be classified as one or more of an access violation, a configurational violation, an unauthorized modification, a usage violation, and an unsecured surface violation. As used herein, an access violation occurs when a user 110 attempts to access a component of system 120 that user 110 does not have access to. For example, user 110a may have access to one or more components in application stack 125a but does not have access to middleware stack 125b. Thus, system 120 will determine that user 110a's request to access middleware stack 125b is an access violation. A configurational violation occurs when a user 110 attempts to change or tweak the configuration of a component of system 120. This disclosure recognizes that components of system 120 may require changing or tweaking at one point or another. As such, selected users 110 may be authorized to make configurational changes. However, some users, for example, user 110b may not have permission from system 120 to make configurational changes to components of system 120 and thus, a request to make such changes may be determined to be a configurational violation. As used herein, a usage violation occurs when user 110 requests to perform a function that the system 120 does not permit user 110 to do. As an example, system 120 may permit user 110 to perform actions A, B, and C on system 120. Any attempt by user 110 to perform action D on system 120 will constitute a usage violation. Finally, an unsecured service violation may occur when a user attempts to access or tweak or change vulnerable files in system 120. For example, a new server may store a number of vulnerable files that, if changed by an unauthorized user, may pose a serious threat to system 120. In such a situation, any attempt by an unauthorized user (e.g., user 110b) to access the vulnerable files may constitute an unsecured surface violation.

In some embodiments, identification engine 210 may classify new violation 155 based on characteristics of new violation 155. Taking the above examples of new violations 155a and 155b, identification engine 210 may classify new violation 155a by user 110a as a usage violation (because user 110a did not have permission from system 120 to update a database in database stack 125c) and classify new violation 155b as an unauthorized modification (because user 110b is not authorized to make changes in network stack 125f). As illustrated in FIG. 2, identification engine 210 classifies new violation 155 as a usage violation.

Identification engine 210 may also be configured to identify one or more components or stacks 125 of system 120 affected by new violation 155 in some embodiments. For example, identification engine 210 may determine that new violation 155 was a usage violation (UV) that occurred in application stack 125a of system 120. Subsequently, identification engine 210 may determine that a next violation was an unsecured surface violation (USV) that occurred in network stack 125f. Although this disclosure describes specific examples of stacks 125 that may be affected by new violation 155, this disclosure recognizes that new violation 155 may affect any stack 125 (e.g., application stack 125a, middleware stack 125b, database stack 125c, operating stack 125d, hardware stack 125e, and network stack 125f) or component of system 120.

Security tool 130 may comprise an evaluation engine 220 in some embodiments. As described above, evaluation engine 220 may be configured to determine whether new violation 155 poses a threat to system 120. In some embodiments, evaluation engine 220 assesses the threat of new violation 155 after identification engine 210 has classified the violation. In contrast to traditional systems, evaluation engine 220 assesses the threat of new violation 155 based at least on one or more existing violations 145.

As described above, an existing violation 145 is a system violation that was previously presented to system 120. Each existing violation 145 may be classified as a type of system violation. In some embodiments, each existing violation 145 was classified by identification engine 210. As illustrated in FIG. 2, system 120 has experienced three previous violations: a first existing violation ("$EV_1$") 145a was an access violation; a second existing violation ("$EV_2$") 145b was an unauthorized modification; and a third existing violation ("$EV_3$") 145c was a configurational violation.

In some embodiments, evaluation engine 220 determines whether new violation 155 presents a threat to system 120 by first determining one or more combinations of new violation 155 with one or more existing violations 145. As depicted in FIG. 2, evaluation engine 220 constructs all possible combinations 225 of new violation 155 and one or more existing violations 145a-c in memory 135. In some embodiments, each combination 225 includes at least the classification of the new violation 155 and the classification of one or more of the existing violations 145. This is depicted in FIG. 2, wherein each combination includes UV, the classification of new violation 155, and one or more classifications of existing violations 145a-c. For example, Combination 1 ("$C_1$" 225a) includes UV and the classifications of $EV_1$, $EV_2$, and $EV_3$. As another example, Combination 2 ("C2") 225b includes UV and the classifications of $EV_1$ and $EV_3$. FIG. 2 shows all seven possible combinations ($C_1$-$C_7$) 225a-g of new violation 155 with existing violations 145.

Once all combinations 225 have been determined, evaluation engine 220 compares each combination 225 to each entry 140. As described above in reference to FIG. 1, memory 135 may comprise a plurality of entries 140. The plurality of entries 140 may be preloaded into memory 135 by a system administrator. Each entry of the plurality of entries 140 may be added to, deleted, or otherwise modified. For example, a system administrator may add, delete, or otherwise modify an entry 140 in response to learning that a particular combination of system violations is or is not a threat to system 120. Each entry may comprise one or more classifications of system violations and an indication of whether the one or more classifications present a threat to system 120. For example, entries 140a, 140b, and 140c are stored in memory 135. Entry #1 ("$E_1$") 140a comprises the following classifications: an access violation (AV); an access violation (AV); and a configurational violation (CV). $E_1$ also includes an indication that the particular combination (AV, AV, CV) is a threat. In contrast, Entry #2 ("$E_2$") 140b includes a usage violation (UV) and an unauthorized modification (UM) and includes an indication that the particular combination (UV, UM) does not constitute a threat to the system 120. Finally, Entry #3 ("$E_3$") 140c includes the following classification of system violations: a configurational violation (CV); an access violation (AV); an unauthorized modification (UM), and a configurational violation (CV). $E_3$ 140c also includes an indication that this particular combination (UV, AV, UM, CV) does not constitute a threat to system 120.

As described above, evaluation engine 220 may be configured to determine whether new violation 155 is a threat to system 120. In some embodiments, determining whether new violation 155 is a threat to system 120 is an algorithm that can be executed by evaluation engine 220. The following is an example of an algorithm that may be performed by evaluation engine 220: In some embodiments, evaluation engine 220 determines that new violation 155 is a threat to the system by (1) comparing each combination 225 to each entry 140; (2) determining, for each combination 225, whether an entry 140 includes the combination 225; and (3) identify, for each combination 225 present in an entry 140, a threat indicator corresponding to the combination 225; and (4) determining that new violation 155 is a threat if one of the identified threat indicators corresponds to a "threat" indication. For example, if the threat indicator of a combination 225 suggests "threat," new violation 155 presents a threat to system 120. On the other hand, if the threat indicator suggests "no threat," new violation 155 does not present a threat to system 120. In this way, evaluation engine 220 may determine whether new violation 155 is a threat to system 120. As illustrated in FIG. 2, the combinations of $C_1$ 225a and $C_5$ 225e are combinations included in at least one entry 140. More particularly, the combination of $C_1$ 225a (UV, AV, UM, CV) matches the combination listed in $E_3$ 140c and the combination of $C_5$ 225e matches the combination listed in $E_2$ 140b. After identifying any matches between combinations 225 and entries 140, evaluation engine 220 determines whether new violation 155 is a threat to system 120. In some embodiments, determining whether new violation 155 presents a threat to system 120 is based on the indicator corresponding to a matching entry 140. For example, $E_3$ 140c includes a "threat" indication and therefore, evaluation engine 220 may impute the "threat" indication onto $C_1$ 225a. As another example, $E_2$ 140b includes a "no threat" indication and therefore evaluation engine 220 may impute the "no threat" indication onto $C_5$ 225e. Evaluation engine 220 may determine that new violation 155 presents a threat to system 120 if at least one combination 225 corresponds to a "threat" indication. Accordingly, as illustrated in FIG. 2, evaluation engine 220 will determine that new violation 155 presents a threat to system 120. In some embodiments, evaluation engine 220 may base its determination on factors other than the classifications of system violations. For example, in one embodiment, evaluation engine 220 may determine whether new violation 155 is a threat to system 120 based on the classifications of system violations and the location of each violation. In such an embodiment, evaluation engine 220 may receive information about a stack 120 affected by each existing violation 145 and a stack 120 affected by new violation 155 and construct combinations 225 based on this information. As an example, identification engine 210 may determine that new violation 155 was a usage violation (UV) affecting application stack 125a and $EV_2$ was an unauthorized modification in middleware stack 125b. Thus, C5 would comprise a UV in application stack 125a and a UM in middleware stack 125b. This particular combination may be found in entries 140. For example, evaluation engine may determine that this particular combination is found in entries 140 at $E_2$ 140b (if the UV in $E_2$ is associated with application stack 125a and the UM in $E_2$ is associated with middleware stack 125b).

In some embodiments, after determining that new violation 155 poses a threat, security tool 130 flags particular combinations for further review. This flagging function may be performed by notification engine 230 in some embodiments. Notification engine 230 may be configured to flag each combination 225 matching at least one entry 140 in some embodiments. In other embodiments, notification engine 230 flags only those combinations that correspond to a "threat" indication. As an example, notification engine 230 may perform the following example algorithm: (1) receive, from evaluation engine 220, an identification of each combination 225 that was present in at least one entry 140 and an identification of the threat indication corresponding to each combination 225; (2) flag (e.g., by highlighting or noting) each combination 225 corresponding to a "threat" indication; (3) not flag each combination 225 corresponding to a "no threat" indication." Notification engine 230, in other embodiments, may be configured to run a different algorithm. For example, notification engine 230 may run the following algorithm: (1) receive, from evaluation engine 220, an identification of each combination corresponding to a "threat" indication; and (2) flag each of the identified combinations. As illustrated in FIG. 2, notification engine 230 flags $C_1$ 225a. In some embodiments, notification engine 230 sends a notification to a system administrator to review each flagged response. In the illustrated example, notification engine 230 may notify a system administrator to review the evaluation engine's determination that the $C_5$ combination (UV, AV, UM, CV) actually presents a threat to system 120. The notification may take any form, including but not limited to an alert and/or a message to the system administrator.

Security tool 130 may also include a verification engine 240 in some embodiments. Verification engine 240 may be configured to receive input 245 about a particular combination 225. The particular combination 225 may or may not have been flagged by notification engine 230. In some embodiments, input 245 comprises verification that a particular combination 225 is or is not a threat to system 120. As illustrated in FIG. 2, verification engine 240 receives input 245 about $C_1$ 225a. Although this disclosure describes and depicts receiving input about flagged combination $C_1$ 225a, this disclosure recognizes that verification engine 240 may receive input about any combination 225 from any suitable source. In some embodiments, the source may be a system administrator.

In addition to receiving input 245, verification engine 240 may also be configured to update one or more entries 140 stored in memory 135. In some embodiments, verification engine 240 updates the one or more entries 140 based on input 245. For example, a system administrator (e.g., user 110a) may be notified to review $C_1$ 225a by notification engine 230. The system administrator may determine during her review of $C_1$ 225a that the combination of $C_1$ 225a (UV, AV, UM, CV) is actually not a threat to system 120 (in contrast to the "threat" indication of corresponding entry $E_3$ 140c). Thus, the system administrator may provide input 245 comprising a new indication corresponding to the administrator's determination ("no threat" indication). In response to receiving this input 245, verification engine 240 may update the indication associated with $E_3$ 140c. For example, verification engine 240 may replace the indication of $E_3$ 140c with the new indication received as input 245. Alternatively, if the system administrator confirms that the combination of $C_1$ 225a (UV, AV, UM, CV) is a threat to system 120, input 245 of system administrator may include a confirmation with a time stamp indicating the date and/or time that the particular combination was reviewed. Verification engine 240 may also be configured save such time stamp information to memory 135.

An example of an algorithm that may be performed by verification engine 240 is: (1) receive input 245 comprising an updated threat indication of combination 225; (2) determine, by querying entries 140 stored in memory 135, an entry 140 comprising the combination 225; (3) retrieving the entry 140 comprising combination 225 from memory 135; (4) comparing the threat indication of the entry 140 to the updated threat indication of combination 225; (5) determining that the threat indication of the entry 140 is different than the updated threat indication of combination 225; (6) replacing the threat indication of entry 140 with the updated threat indication; (7) storing the updated entry 140 in memory 135.

Security tool 130 may include an enhancement engine 250 in some embodiments. Enhancement engine 250 may be configured to enhance the security of system 120 in response to determining that new violation 155 presents a threat to system 120. As illustrated in FIG. 2, enhancement engine 250 may increase the security of system 120 in response to the determination by evaluation engine 220 that new violation 155 is a threat to system 120. Enhancement engine 250 may increase the security of system 120 by increasing an authorization level and/or increasing an authentication level. As used herein, authentication refers to the verification of a user's identity. In some embodiments, user 110 is authenticated by system 120 when user 110 first sends a request to system 120 (e.g., to login to system 120). As an example and not by way of limitation, user 110 may authenticate himself or herself to system 120 with a username and password. User 110 may also verify his or her identity through various other authentication modes such as entering a code or pin, selecting a visual image, and/or answering security questions.

On the other hand, authorization refers to the process of verifying a user's access to, or activity on, system 120. In most cases, user 110 must authenticate himself or herself prior to being authorized by system 120. Thus, an increase in authorization level may occur at any point after user 110 has logged into system 120. Authorization may require a user 110 to re-authenticate himself or herself one or more times. For example, after user 110 initially authenticates himself to system 120, user 110 submits a request to system 120 which security tool 130 determines to be a system violation. Upon determining that a system violation has occurred, enhancement engine 250 increases an authorization level and prompts user 110 to re-authenticate. As used herein, increasing an authorization level requires user 110 to re-authenticate using a mode of authentication previously performed. For example, if user 110 initially logged into system 120 using a password, increasing the authorization level may require user 110 to re-authenticate using his/her password. This disclosure recognizes that user 110 may initially authenticate using various modes of authentication. For example, a user may initially authenticate himself/ herself by entering a password associated with him or her, by entering a code sent to an electronic device (e.g., device 115) associated with user 110, by selecting a visual image associated with user 110, and/or answering a security question associated with user 110.

Security tool 130 may also increase security of system 120 by increasing an authentication level. As used herein, increasing an authentication level requires user 110 to re-authenticate himself/herself using an authentication mode not previously performed. For example, in response to determining that new violation 155 poses a threat to system 120, enhancement engine 250 increases an authentication level by requiring user 110 to re-authenticate using an authentication mode other than a password (e.g., if user 110 logs into system 120 using password, increasing authentication level requires user 100 to re-authenticate using a visual image or a security question). In some embodiments, after user 110 successfully authenticates himself/herself at the increased security level, system 120 returns a response to user 110's request.

The following is an example of an algorithm that may be executed by enhancement engine 250: (1) receive, from evaluation engine 220, a determination about whether new violation 155 is a threat to system 120; (2) if evaluation 220 determinates that new violation 155 is a threat to system 120, determine an authentication mode previously performed by the user 110 corresponding to new violation 155; (3) determine an authentication mode different from the authentication mode previously performed by the user 110; (5) prompt user 110 to authenticate himself using the different authentication mode; (6) if user 110 properly authenticates himself using the different authentication mode, continue to respond to requests of user 110.

As described above, one issue associated with traditional systems is that genuine users may be prevented from interacting with system 120 (receiving responses to user 110 requests). This is because, in a traditional system, the system blocks or otherwise prevents system 120 from responding to a user request after determining that the user request amounts to a system violation that may threaten system 120. Rather than block or otherwise prevent all interactions between system 120 and user 110 based on a threat assessment of a system violation, this disclosure recognizes increasing the security of system 110 in response to determining that a system violation may threaten system 120. Increasing the security of system 120 may ensure that authorized users are permitted to interact with system 120 and unauthorized users are prevented from interacting with system 120. As a result, an authorized user is not prevented from interacting with system 120 based on a false positive.

Figure 3:
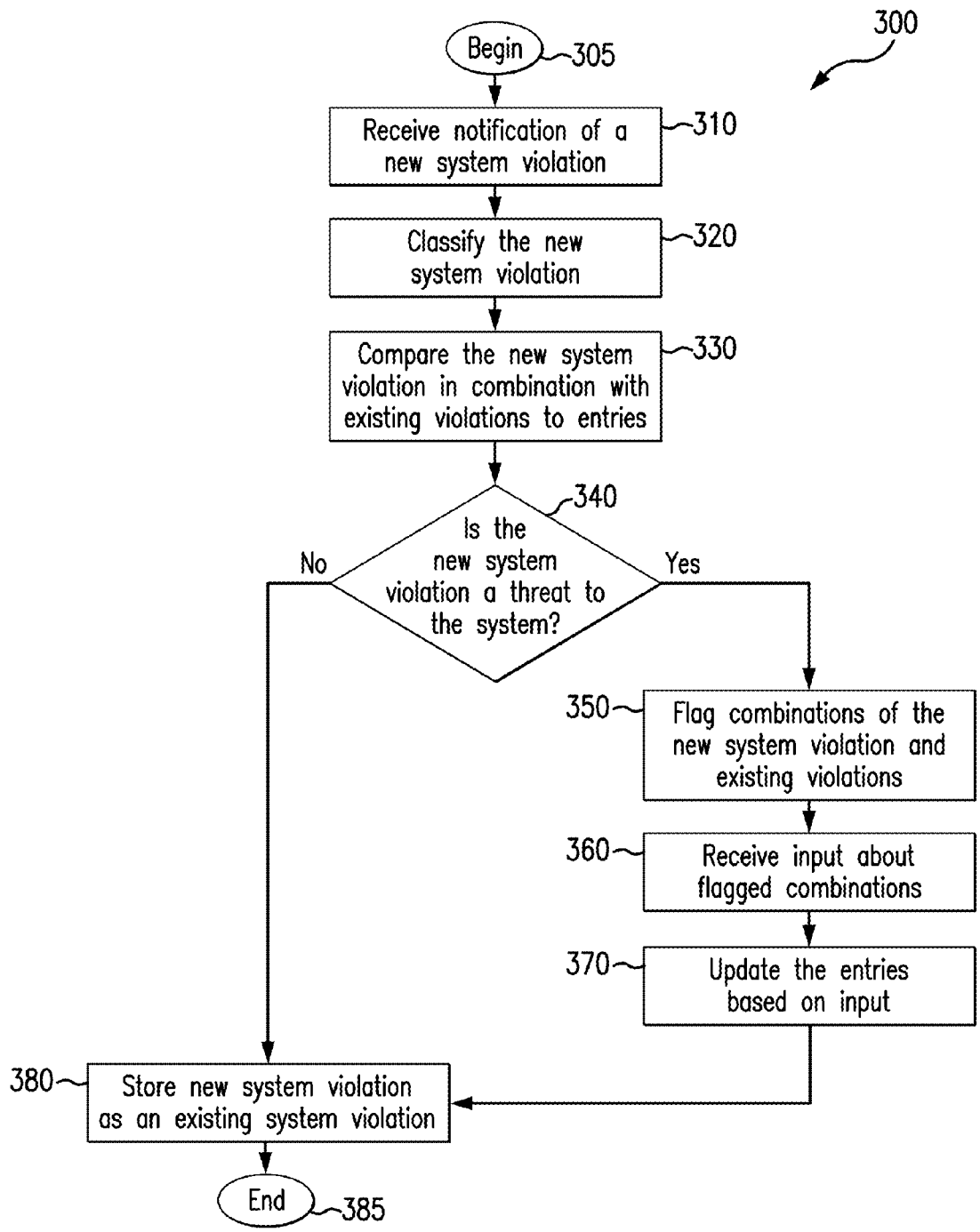
FIG. 3 is a flow chart illustrating a method for assessing system violations using the security tool of FIG. 2, according to one embodiment of the present disclosure.

FIG. 3 illustrates a method of determining whether a new violation is a threat to system 120. In some embodiments, the method 300 is performed by security tool 130. The method 300 begins in a step 305. At step 310, security violation assessment tool 130 receives notification of a new system violation (e.g., new system violation 155). As described above, security violation assessment tool 130 may, in some embodiments, monitor a plurality of baselines and identify deviations from those baselines as security violations. In other embodiments, the monitoring of baselines and identification of deviations is performed by another component of network environment 100. Regardless of whether security violation assessment tool 130 identifies a system violation, security violation assessment tool 130 receives a notification when the security violation has occurred. The receiving step may be performed by identification engine 210 in some embodiments. In some embodiments, the method 300 continues to a step 320.

At step 320, security violation assessment tool 130 classifies new system violation 155. New system violation 155 may be classified as one or more of an access violation, a configurational violation, an unauthorized modification, a usage violation, and/or an unsecured surface violation. Classification of new system violation 155 may be performed by identification engine 210 and may be based on characteristics of the system violation. For example, in some embodiments, new system violation 155 is classified based on one or more of a user 110 associated with new system violation 155, a stack 125 affected by new system violation 155, the particular action user 110 was taking within system 120. After classifying new system violation 155, the method 300 may continue to a step 330.

At step 330, security violation assessment tool 130 compares new system violation 155 in combination with existing violations 145 to entries 140. In some embodiments, existing violations 145 and entries 140 are stored in memory 135 and memory 135 is communicably coupled to security violation assessment tool 130. In some embodiments, the comparison is performed by evaluation engine 220. Evaluation engine 220 may determine one or more combinations 225 of new violation 155 with one or more existing violations 145. For example as illustrated in FIG. 2, evaluation engine 220 determines seven combinations 225 of new violation 155 with one or more existing violations 145a-c. Evaluation engine 220 may also be configured to compare each combination 225 to each entry 140. For example, as illustrated in FIG. 2, each combination 225 is compared to the combinations of each entry 140a-c. In some embodiments, method 300 continues to a step 340.

At step 340, security violation assessment tool 130 determines whether new system violation 155 is a threat to system 120. In some embodiments, this determination is made by evaluation engine 220. Evaluation engine 220 may determine that new system violation 155 is a threat to the system based on one or more of the existing violations 145 in combination with new system violation 155 and one or more entries 140. In some embodiments, evaluation engine 220 determines that new system violation 155 is a threat to system 120 by imputing a threat or no threat indication of an entry 140 on one or more combinations 225. For example, evaluation engine 220 may automatically detect a combination 225 (e.g., $C_1$ 225a) which is present in an entry 140 (e.g., $E_3$ 140c) and impute the indication of the entry 140 (e.g., "threat") on the combination (e.g., $C_1$ 225a poses a threat to system 120).

If evaluation engine 220 does not find any combination 225 present in an entry 140, evaluation engine 220 may determine that new system violation 155 is not a threat to system 120. Additionally, evaluation engine 220 may determine that new system violation 155 is not a threat to system 120 if all imputed indications on combinations 225 are "no threat" indications. In some embodiments, if security violation assessment tool 130 determines that new system violation 155 does not present a threat to the system, method 300 continues to step 380. Conversely, if security violation assessment tool 130 determines that new system violation 155 is a threat to system 120 (e.g., by imputing a "threat" indication on one or more combinations 225), the method 300 continues to a step 350.

At step 350, security violation assessment tool 130 flags any combination 225 that has been determined to be a threat to system 120. For example, as illustrated in FIG. 2, evaluation engine 220 flags $C_1$ 225a because the combination of system violations (UV, AV, UM, CV) was present in $E_3$ 140c and $E_3$ 140c includes a "threat" indication. In some embodiments, the flagging of combinations 225 is performed by notification engine 230. In some embodiments, notification engine 230 is also configured to send a notification to a system administrator to review the flagged combinations. In other embodiments, a system administrator will review the flagged combinations when he/she is next operating, updating, or otherwise acting upon system 120. In some embodiments, after all combinations 225 corresponding to "threat" indications have been flagged, the method 300 continues to a step 360.

At step 360, security violation assessment tool 130 receives input 245 about each flagged combination. In some embodiments, input 245 is received from a system administrator. Input 245 may comprise an indication or determination or verification of the threat posed by the flagged combination. For example, in FIG. 2, a system administrator may provide input 245 that, contrary to the indication of $E_3$ 140c, the combination of system violations of $C_1$ 225a do not pose a threat to system 120. Based on input 245, security violation assessment tool 130 may update a corresponding entry ($E_3$ 140c in memory 135). As a result, in an assessment of a subsequent system violation, the updated combination ($C_1$ 225a) would not be assessed as a threat. The updating of one or more entries 140 may be performed by verification engine 240 in some embodiments. The method 300 may continue to a step 380 in some embodiments.

At step 380, new violation 155 is stored as an existing violation 145. For example as illustrated in FIG. 2, security violation assessment tool 130 may add new violation 155 to the plurality of existing violations 145. For example, one or more of the engines depicted in FIG. 2 (e.g., 210, 220, 230, 240, 250) or an entirely different engine (e.g., a conversion engine (not depicted)) may save new violation 155 to existing violations 145. In saving new violation 155 as an existing violation, a new existing violation (e.g., Existing Violation #4 ($EV_4$)) may be added to existing violations 145. $EV_4$ may include a classification of new system violation 155 (a usage violation). After storing new system violation 155 as an existing system violation, the method 300 may continue to an end step 385.

Figure 4:
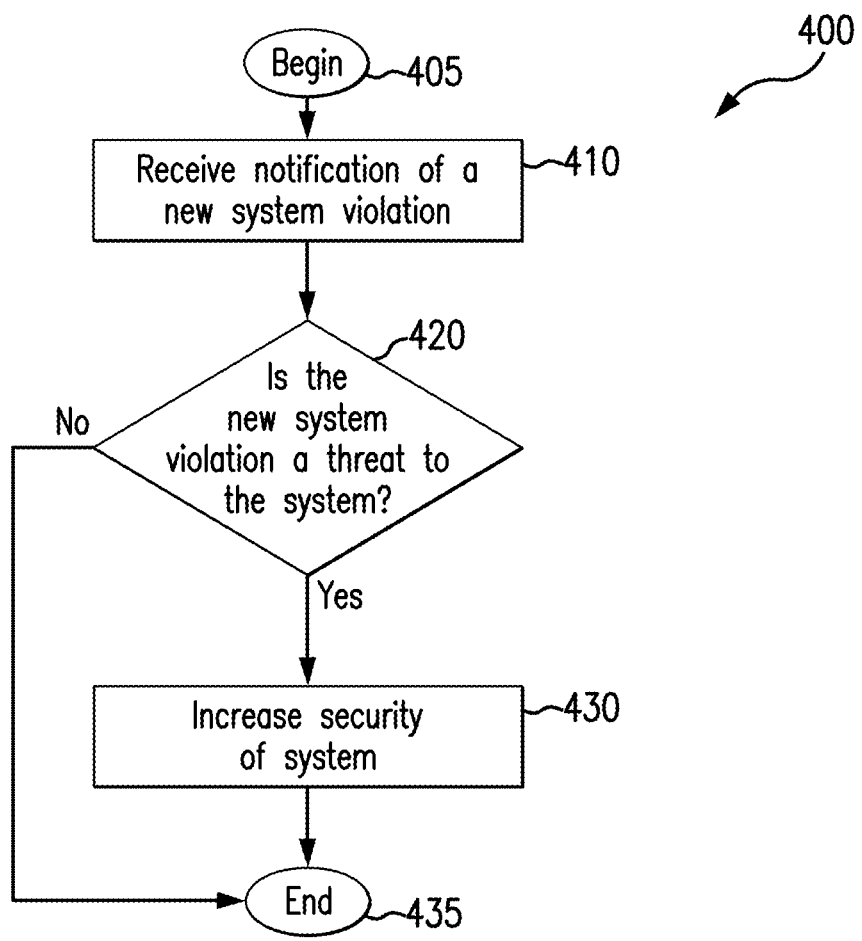
FIG. 4 is a flow chart illustrating a method for enhancing the security of the system using the security tool of FIG. 2, according to one embodiment of the present disclosure.

FIG. 4 illustrates a method of increasing the security of system 120. In some embodiments, steps of method 400 may occur in parallel with one or more steps of method 300. For example, the method 400 may begin at step 405 and continue to a step 410. The method 400 may, in some embodiments, be performed by security tool 130. At step 410, security enhancement tool 130 receives a notification of a new system violation (e.g., new violation 155 of FIGS. 1 & 2). In some embodiments, notification occurs as described above in reference to FIG. 3. After receiving notification of new violation 155, method 400 may continue to a step 420.

At a step 420, security enhancement tool 130 determines whether the new system violation is a threat to system 120. In some embodiments, step 420 may encompass one or more steps of method 300. For example, security enhancement tool 130 may determine whether new violation 155 is a threat to system 120 by performing steps 320-340 of method 300. If security enhancement tool 130 determines that the new system violation is not a threat to the system, then system 400 may continue to an end step 435. Alternatively, if security enhancement tool 130 determines that the new system violation is a threat to the new system, then method 400 may continue to a step 430.

At step 430, security enhancement tool 130 increases the security of system 120. In some embodiments, security enhancement tool 130 increases the security of system 120 by increasing an authorization level. In other embodiments, security enhancement tool 130 increases the security of system 120 by increasing an authentication level. As described above, increasing the authorization level of system 130 may comprise prompting a user 110 to re-authenticate himself one or more times using a mode of authentication previously performed and increasing the authentication level may comprise prompting a user 110 to re-authenticate himself one or more times using a mode of authentication not previously performed. In some embodiments, an authentication mode may be a password, a code, a visual image, and a security question. Although this disclosure describes particular forms of authentication modes, this disclosure recognizes that user 110 may authenticate himself/herself using any suitable mode, After increasing the security of system 120, the method 400 may continue to an end step 435.

Figure 5:
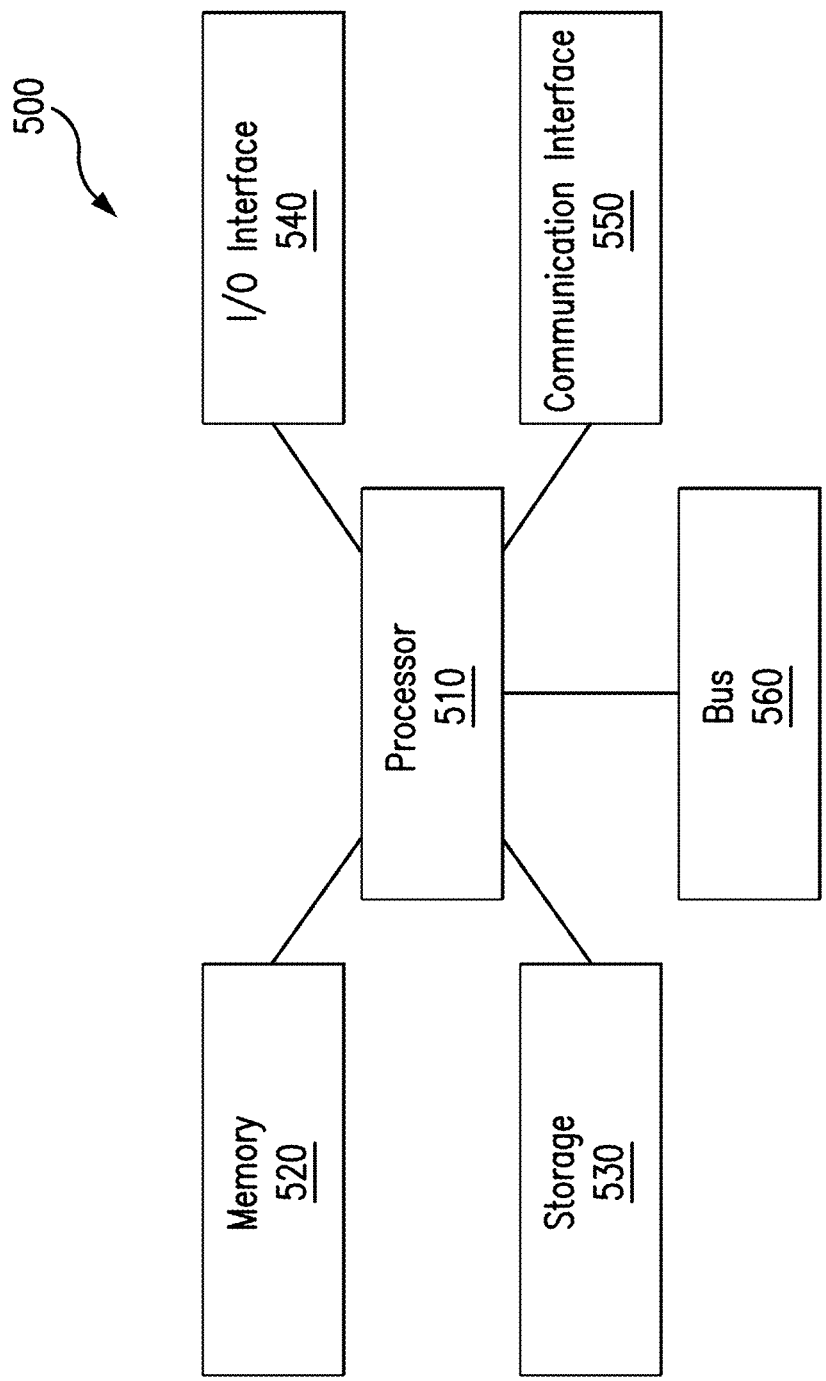
FIG. 5 is a block diagram illustrating a computer operable to execute the security tool of FIG. 2, according to certain embodiments.

FIG. 5 illustrates an example of a computer system 500. As described above, security tool 130 may be a program that is implemented by a processor of a computer system such as computer system 500. Computer system 500 may be any suitable computing system in any suitable physical form. In some embodiments, computer system 500 may be device 115. As an example and not by way of limitation, computer system 500 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

One or more computer systems 500 may perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As an example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

Computer system 500 may include a processor 510, memory 520, storage 530, an input/output (I/O) interface 540, a communication interface 550, and a bus 560 in some embodiments, such as depicted in FIG. 7. Although this disclosure describes and illustrates a particular computer system having a particular number of particular components in a particular arrangement, this disclosure contemplates any suitable computer system having any suitable number of any suitable components in any suitable arrangement.

Processor 510 includes hardware for executing instructions, such as those making up a computer program, in particular embodiments. For example, processor 510 may execute security tool 130 in some embodiments. As an example and not by way of limitation, to execute instructions, processor 510 may retrieve (or fetch) the instructions from an internal register, an internal cache, memory 520, or storage 530; decode and execute them; and then write one or more results to an internal register, an internal cache, memory 520, or storage 530. In particular embodiments, processor 510 may include one or more internal caches for data, instructions, or addresses. This disclosure contemplates processor 510 including any suitable number of any suitable internal caches, where appropriate. As an example and not by way of limitation, processor 510 may include one or more instruction caches, one or more data caches, and one or more translation lookaside buffers (TLBs). Instructions in the instruction caches may be copies of instructions in memory 520 or storage 530, and the instruction caches may speed up retrieval of those instructions by processor 510. Data in the data caches may be copies of data in memory 520 or storage 530 for instructions executing at processor 510 to operate on; the results of previous instructions executed at processor 510 for access by subsequent instructions executing at processor 510 or for writing to memory 520 or storage 530; or other suitable data. The data caches may speed up read or write operations by processor 510. The TLBs may speed up virtual-address translation for processor 510. In particular embodiments, processor 510 may include one or more internal registers for data, instructions, or addresses. This disclosure contemplates processor 510 including any suitable number of any suitable internal registers, where appropriate. Where appropriate, processor 510 may include one or more arithmetic logic units (ALUs); be a multi-core processor; or include one or more processors 175. Although this disclosure describes and illustrates a particular processor, this disclosure contemplates any suitable processor.

Memory 520 may include main memory for storing instructions for processor 510 to execute or data for processor 510 to operate on. As an example and not by way of limitation, computer system 500 may load instructions from storage 530 or another source (such as, for example, another computer system 500) to memory 520. Processor 510 may then load the instructions from memory 520 to an internal register or internal cache. To execute the instructions, processor 510 may retrieve the instructions from the internal register or internal cache and decode them. During or after execution of the instructions, processor 510 may write one or more results (which may be intermediate or final results) to the internal register or internal cache. Processor 510 may then write one or more of those results to memory 520. In particular embodiments, processor 510 executes only instructions in one or more internal registers or internal caches or in memory 520 (as opposed to storage 530 or elsewhere) and operates only on data in one or more internal registers or internal caches or in memory 520 (as opposed to storage 530 or elsewhere). One or more memory buses (which may each include an address bus and a data bus) may couple processor 510 to memory 520. Bus 560 may include one or more memory buses, as described below. In particular embodiments, one or more memory management units (MMUs) reside between processor 510 and memory 520 and facilitate accesses to memory 520 requested by processor 510. In particular embodiments, memory 520 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 520 may include one or more memories 180, where appropriate. Although this disclosure describes and illustrates particular memory, this disclosure contemplates any suitable memory.

Storage 530 may include mass storage for data or instructions. As an example and not by way of limitation, storage 530 may include a hard disk drive (HDD), a floppy disk drive, flash memory, an optical disc, a magneto-optical disc, magnetic tape, or a Universal Serial Bus (USB) drive or a combination of two or more of these. Storage 530 may include removable or non-removable (or fixed) media, where appropriate. Storage 530 may be internal or external to computer system 500, where appropriate. In particular embodiments, storage 530 is non-volatile, solid-state memory. In particular embodiments, storage 530 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 530 taking any suitable physical form. Storage 530 may include one or more storage control units facilitating communication between processor 510 and storage 530, where appropriate. Where appropriate, storage 530 may include one or more storages 140. Although this disclosure describes and illustrates particular storage, this disclosure contemplates any suitable storage.

I/O interface 540 may include hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 540 may include one or more device or software drivers enabling processor 510 to drive one or more of these I/O devices. I/O interface 540 may include one or more I/O interfaces 185, where appropriate. Although this disclosure describes and illustrates a particular I/O interface, this disclosure contemplates any suitable I/O interface.

Communication interface 550 may include hardware, software, or both providing one or more interfaces for communication (such as, for example, packet-based communication) between computer system 500 and one or more other computer systems 500 or one or more networks (e.g., network 110). As an example and not by way of limitation, communication interface 550 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 550 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 550 for any of these networks, where appropriate. Communication interface 550 may include one or more communication interfaces 190, where appropriate. Although this disclosure describes and illustrates a particular communication interface, this disclosure contemplates any suitable communication interface.

Bus 560 may include hardware, software, or both coupling components of computer system 500 to each other. As an example and not by way of limitation, bus 560 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 560 may include one or more buses 212, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may comprise software, hardware, other logic, or any suitable combination of the preceding.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. In certain embodiments, the methods may be performed in parallel (e.g. methods depicted in FIGS. 3 and 4).

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

What is claimed is:

1. A security violation assessment tool comprising:
   a memory configured to store:
      a plurality of entries, wherein each entry comprises:
         a classification of one or more system violations, wherein each system violation comprises a deviation from a baseline, the baseline being assigned to a specific user of a system;
         an indication of whether the one or more system violations is a threat to the system, wherein the threat to the system is one or more of:
            a loss of confidentiality of the system;
            a loss of integrity of the system;
            a loss of availability of the system;
            a loss of accountability of the system;
            a damage to a reputation of the system;
            a non-compliance issue; and
            a violation of privacy; and
         an identification of one or more components of the system threatened by the one or more system violations; and
      a plurality of existing system violations, wherein each existing system violation indicates:
         a previous deviation from a baseline and comprises at least a classification of the existing system violation; and
         an identification of one or more components threatened by the existing system violation;
   an identification engine configured to:
      receive a notification of a new system violation;
      classify, based on characteristics of the new system violation, the new system violation as one or more of:
         an access violation;
         a configurational violation;
         an unauthorized modification;
         a usage violation; and
         an unsecured surface violation; and
      identify a component of the system threatened by the new violation, wherein the threatened component is part of at least:
         an application stack of the system;
         a middleware stack of the system;
         a database stack of the system;
         an operating system stack of the system;
         a hardware stack of the system; and
         a network stack of the system;
   an evaluation engine configured to:
      compare the new system violation in combination with one or more of the plurality of existing system violations to the plurality of entries; and
      determine, based on the comparison of the new system violation and the one or more plurality of existing system violations to the plurality of entries, whether the new system violation threatens the system; and
   a notification engine configured to flag for review the new system violation in combination with the one or more of the plurality of existing system violations in response to a determination that the new system violation in combination with the one or more of the plurality of existing system violations threatens the system.

2. The security violation assessment tool of claim 1, wherein:
   the new system violation is performed by a first user of the system;
   the first user is assigned a first baseline, wherein the first baseline corresponds to activities on the system that the first user is approved to participate in; and
   activity of the first user that deviates from the baseline triggers the new system violation.

3. The security violation assessment tool of claim 1, further comprising a verification engine configured to:
   receive input indicating whether the new system violation in combination with the one or more of the plurality of existing system violations is a threat to the system; and
   update the plurality of rules based on the received input.

4. A method comprising:
   receiving a notification of a new system violation;
   classifying, based on characteristics of the new system violation, the new system violation as one or more of:
      an access violation;
      a configurational violation;
      an unauthorized modification;
      a usage violation; and
      an unsecured surface violation;
   identifying a component of a system threatened by the new violation, wherein the threatened component is part of at least:
      an application stack of the system;
      a middleware stack of the system;
      a database stack of the system;
      an operating system stack of the system;
      a hardware stack of the system; and
      a network stack of the system;
   comparing the new system violation in combination with one or more of a plurality of existing system violations to a plurality of entries, wherein:
      each of the plurality of existing system violations indicates:
         a previous deviation from a baseline and comprises at least a classification of the existing system violation; and
         an identification of one or more components threatened by the existing system violation; and
      each of the plurality of entries comprises at least:
         a classification of one or more system violations, wherein each system violation comprises a deviation from a baseline, the baseline being assigned to a specific user of the system;
         an indication of whether the one or more system violations is a threat to the system, wherein the threat to the system is one or more of:
            a loss of confidentiality of the system;
            a loss of integrity of the system;

a loss of availability of the system;
a loss of accountability of the system;
a damage to a reputation of the system;
a non-compliance issue; and
a violation of privacy; and
an identification of one or more components of the system threatened by the one or more system violations; and
determining, based on the comparison of the new system violation and the one or more plurality of existing system violations to the plurality of entries, whether the new system violation threatens the system; and
flagging for review the new system violation in combination with the one or more of the plurality of existing system violations in response to a determination that the new system violation in combination with the one or more of the plurality of existing system violations threatens the system.

5. The method of claim 4, wherein:
the new system violation is performed by a first user of the system;
the first user is assigned a first baseline, wherein the first baseline corresponds to activities on the system that the first user is approved to participate in; and
activity of the first user that deviates from the baseline triggers the new system violation.

6. The method of claim 4, further comprising:
receiving input indicating whether the new system violation in combination with the one or more of the plurality of existing system violations is a threat to the system; and
updating the plurality of entries based on the received input.

7. One or more computer-readable non-transitory storage media embodying software that is operable when executed to:
receive a notification of a new system violation;
classify, based on characteristics of the new system violation, the new system violation as one or more of:
an access violation;
a configurational violation;
an unauthorized modification;
a usage violation; and
an unsecured surface violation;
identify a component of a system threatened by the new violation, wherein the threatened component is part of at least:
an application stack of the system;
a middleware stack of the system;
a database stack of the system;
an operating system stack of the system;
a hardware stack of the system; and
a network stack of the system;
compare the new system violation in combination with one or more of a plurality of existing system violations to a plurality of entries, wherein:
each of the plurality of existing system violations indicates:
a previous deviation from a baseline and comprises at least a classification of the existing system violation; and
an identification of one or more components threatened by the existing system violation;
each of the plurality of entries comprises at least:
a classification of one or more system violations, wherein each system violation comprises a deviation from a baseline, the baseline being assigned to a specific user of the system; and
an indication of whether the one or more system violations is a threat to the system, wherein the threat to the system is one or more of:
a loss of confidentiality of the system;
a loss of integrity of the system;
a loss of availability of the system;
a loss of accountability of the system;
a damage to a reputation of the system;
a non-compliance issue; and
a violation of privacy; and
an identification of one or more components of the system threatened by the one or more system violations;
determine, based on the comparison of the new system violation and the one or more plurality of existing system violations to the plurality of entries, whether the new system violation threatens the system; and
flag for review the new system violation in combination with the one or more of the plurality of existing system violations in response to a determination that the new system violation in combination with the one or more of the plurality of existing system violations threatens the system.

8. The media of claim 7, wherein:
the new system violation is performed by a first user of the system;
the first user is assigned a first baseline, wherein the first baseline corresponds to activities on the system that the first user is approved to participate in; and
activity of the first user that deviates from the baseline triggers the new system violation.

9. The media of claim 7, further comprising:
receiving input indicating whether the new system violation in combination with the one or more of the plurality of existing system violations is a threat to the system; and
updating the plurality of rules based on the received input.

* * * * *